Patented Aug. 11, 1953

2,648,653

UNITED STATES PATENT OFFICE 2,648,653

COMPOSITIONS CONTAINING POLYMERIZED ACRYLONITRILE AND SOLVENT THEREFOR

Gaetano F. D'Alelio, Pittsburgh, Pa., assignor to Koppers Company, Inc., a corporation of Delaware No Drawing. Application September 29, 1950, Serial No. 187,690

16 Claims. (Cl. 260—32.6)

This invention relates to the preparation of compositions of polymeric materials, and to the production of shaped articles therefrom. More specifically, the invention provides new and useful compositions of acrylonitrile polymers, and shaped articles therefrom. Moreover, it provides a method of preparing such shaped articles. The term "polymers" is intended herein to include copolymers.

Very useful polymers have been prepared from acrylonitrile with or without other polymerizable substances, for example, vinyl, vinylidene and other mono-ethylenic compounds, and conjugated diene compounds such as butadiene, etc. These acrylonitrile polymers possess desirable physical and chemical properties including toughness and solvent resistance to common organic solvents such as methyl and ethyl alcohol, acetone, ethyl ether, ethyl acetate, hydrocarbon solvents, chlorinated hydrocarbons and the like. Because of these properties, it has been considered desirable that these polymeric materials be fashioned into fibers, films, and other shaped articles.

In accordance with the present invention it has been found that new compositions useful for the production of shaped articles such as, for example, filaments, films, etc., may be prepared by treating acrylonitrile polymers with carbamates having the formula $(CH_3)_2NCOOCH_2R$, wherein R is hydrogen, methyl, nitro, cyano, thiocyano, nitromethyl, cyanomethyl or thiocyanomethyl. By employing the methods of this invention, new fibers, films and the like having particularly desirable properties can be readily produced.

It has been known that certain copolymers containing less than 85 percent acrylonitrile are soluble in nitroalkanes, such as nitromethane. This is true when the comonomer has substituent groups of low secondary-valence bonding forces, such as acrylates, etc. However, if the comonomer or comonomers have substituent groups of high secondary-valence bonding forces, then the solvent resistance of the acrylonitrile copolymers approaches or is equivalent to that of polyacrylonitrile. Examples of monomers which have high secondary-valence bonding forces and which form acrylonitrile copolymers of high solvent resistance are methacrylonitrile, fumaronitrile, vinylidene chloride, beta-cyano-acrylamide, methyl beta-cyano-acrylate and itaconamide. Copolymers of these with acrylonitrile have strong solvent resistance permitting the use of much less than 85 percent acrylonitrile without loss of solvent resistance. This is illustrated hereinafter by Examples II through IV which show that acrylonitrile copolymers of 20–50 percent vinylidene chloride are insoluble in nitromethane and various other solvents but are soluble in the above-described carbamates.

It has been proposed to use concentrated aqueous solutions of inorganic salts such as lithium bromide, zinc chloride, sodium chloride and sodium sulfocyanide (Rein, U. S. Patent No. 2,140,921), or molten quaternary ammonium salts such as benzyl pyridinium chloride (Rein, U. S. Patent No. 2,117,210), in the preparation of compositions of acrylonitrile polymers. However, these compositions have been found generally unsatisfactory for use in the formation of yarns and films. The former type of solution, upon extrusion into coagulating baths, gives shaped articles that contain large amounts of the inorganic salts contained in the solvent. The presence of the foreign materials in the resultant composition produce discontinuities which cause weakness and brittleness in the shaped articles. The compositions containing the quaternary ammonium salts are dark colored, indicating some decomposition or reaction of the polyacrylonitrile in the presence of the molten salt, and the films or filaments obtained from such solutions are generally extremely brittle, highly colored and very weak.

It has also been proposed (Latham, U. S. Patent No. 2,404,714) that certain compounds containing the dimethyl carbamyl group may be used as solvents for acrylonitrile polymers containing at least about 85 percent by weight acrylonitrile only if the carbon content of the compound be within certain limits. These limits are set by the formula

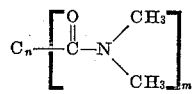

wherein $m$ and $n$ represent integers, $m$ being equal to or greater than 1, and $n$ being of such a value that the ratio $n/m$ is equal to or less than 1.5, except that when $m$ equals 1, $n$ must equal zero.

It has now been found that the new compositions of this invention can be produced by dissolving acrylonitrile polymers in Methyl N,N-dimethyl-carbamate, $(CH_3)_2NCOOCH_3$ Ethyl N,N-dimethyl-carbamate, $(CH_3)_2NCOOC_2H_5$ Nitromethyl N,N-dimethyl-carbamate, $(CH_3)_2NCOOCH_2NO_2$ Cyanomethyl N,N-dimethyl-carbamate,
(CH$_3$)$_2$NCOOCH$_2$CN Thiocyanomethyl N,N - dimethyl - carmabate,
(CH$_3$)$_2$NCOOCH$_2$SCN;

Beta - nitroethyl N,N - dimethyl - carbamate,
(CH$_3$)$_2$NCOOCH$_2$CH$_2$NO$_2$;

Beta - cyanoethyl N,N - dimethyl - carbamate,
(CH$_3$)$_2$NCOOCH$_2$CH$_2$CN;

Beta-thiocyanoethyl N,N - dimethyl - carbamate,
(CH$_3$)$_2$NCOOCH$_2$CH$_2$SCN.

These carbamates are active solvents for polyacrylonitrile, acrylonitrile copolymers containing at least 85 percent acrylonitrile, and acrylonitrile copolymers containing various proportions of the monomers listed above as having high secondary-valence bonding force as well as for acrylonitrile copolymers having less than 85 percent acrylonitrile.

It has also been found that carbamates of the above formula in which R is an alkyl group larger than ethyl will have varying degrees of solvent powers depending on the particular alkyl groups. These latter compounds can be used quite satisfactorily for acrylonitrile copolymers having considerably lower solvent resistance than polyacrylonitrile. Moreover, these higher alkyl carbamates can often be used as plasticizers or softeners for acrylonitrile polymers and copolymers.

With the carbamate solvents of this invention there can be used auxiliary solvents such as N,N-dimethyl formamide, N,N-dimethyl acetamide, etc., and in certain cases with acrylonitrile polymers of lower solvent resistance, the auxiliary solvents can be N,N-diethyl formamide, N,N-diethyl acetamide, N,N-dipropyl formamide, nitromethane, nitroethane, and higher alkyl N,N-dimethyl-carbamates.

This invention will be more carefully described by the following examples although it is understood that the invention is not intended to be limited by these examples. These examples illustrate the use of these N,N-dimethyl-carbamates in preparing compositions of acrylonitrile polymers. In these examples "parts" and "percent" are intended to mean parts and percent by weight.

*Example I*

A 5 percent by weight solution of polyacrylonitrile in methyl N,N-dimethyl-carbamate is prepared simply by adding 5 parts of the polymer to 95 parts of methyl N,N-dimethyl-carbamate at room temperature and stirring the mixture until solution is completed. More concentrated solutions, for example 20-25 percent, are readily prepared by heating a mixture of polymer and methyl N,N-dimethyl-carbamate at temperatures higher than room temperature, including the boiling temperature of methyl N,N-dimethyl-carbamate at atmospheric or superatmospheric pressure. These solutions are particularly useful in the preparation of fibers, films, etc.

Similar useful solutions of polyacrylonitrile are prepared by using, in place of the methyl carbamate, the corresponding ethyl, nitromethyl, cyanomethyl, thiocyanomethyl, beta-nitroethyl, beta-cyanoethyl and beta-thiocyanoethyl N,N-dimethyl-carbamates.

*Example II*

A copolymer of 80 parts acrylonitrile and 20 parts vinylidene chloride is substantially insoluble in methyl alcohol, ethyl alcohol, acetone, methyl acetate, butyl acetate, benzene, cyclohexane, dioxan, monochlorobenzene and cyclohexanone. Likewise it is also insoluble in ordinarily effective solvents such as nitromethane and nitroethane. A 10 percent solution of the same copolymer in methyl N,N-dimethyl-carbamate is effected by stirring at room temperature. More concentrated solutions, for example, 20-25 percent or higher, are prepared by heating the mixtures to temperatures up to and including the boiling point of the carbamate. In some cases the solution is advantageously prepared under superatmospheric pressures. Fibers made from these copolymer compositions, heat-treated under tension for 1 hour at 150° C. and tested in boiling water show a shrinkage of about 3 percent maximum.

*Example III*

A copolymer of 60 parts of acrylonitrile and 40 parts vinylidene chloride behaves in the same manner as the 80-20 copolymer of Example II with regard to insolubility in the common organic solvents and in other highly polar solvents. Solutions of this copolymer in the methyl, ethyl and nitromethyl N,N-dimethyl-carbamates are readily prepared as in Example I. Fibers from these compositions, when heat-treated as in Example II, show a maximum shrinkage of 2 percent. Tenacities of these fibers are in the range of 4-6 grams per denier, and elongations in the range of 12-20 percent, depending on the methods and conditions of treatment. The wet strengths of these fibers are practically equal to their dry strengths.

*Example IV*

A copolymer of 50 parts of acrylonitrile and 50 parts vinylidene chloride is insoluble in the common organic solvents and in nitromethane, and only very slightly soluble in certain cyclic ketones. It is very readily soluble, however, in methyl, cyanomethyl, thiocyanomethyl and beta-nitroethyl N,N-dimethyl-carbamates. Such compositions can be used in the preparation of formed polymers which may be cold-drawn and heat-treated to produce molecularly oriented structures.

*Example V*

Copolymers of 95-90 parts of acrylonitrile and 5-10 parts of vinyl chloride may be dissolved in methyl, cyanometheyl and beta-nitroethyl N,N-dimethyl-carbamates. Fibers from these compositions when heat-treated under tension for one hour at 150° C. and when tested in boiling water show a maximum shrinkage of about 3 percent. Tenacities of these fibers are in the range of 4-6 grams per denier and elongations in the range of 12-20 percent, depending on the methods and conditions of treatment. The wet strengths of these fibers are practically equal to their dry strengths.

*Example VI*

A copolymer of 80 parts of acrylonitrile and 20 parts of styrene is insoluble in the common solvents named in Example II. However, it is soluble in methyl N,N-dimethyl-carbamate and also in cyanomethyl and nitromethyl N,N-dimethyl-carbamates. These compositions are useful in the preparation of formed polymer articles which can be cold-drawn and heat-treated to produce molecularly oriented structures.

*Example VII*

A copolymer of 85 parts of acrylonitrile and 15 parts of dimethyl itaconate is insoluble in acetone and a large number of other common solvents, but it is soluble in methyl, beta-nitroethyl, beta-cyanoethyl and beta-thiocyanoethyl N,N-dimethyl-carbamates. These compositions are useful in the preparation of fibers, films, etc.

*Example VIII*

A copolymer of 95 parts acrylonitrile and 5 parts acrylic acid shows the same solubility characteristics as indicated for the copolymers of Examples II and III. Compositions satisfactory for the preparation of fibers, films, foils, bristles, etc., are readily prepared by dissolving this copolymer in methyl, nitromethyl, cyanomethyl and thiocyanomethyl N,N-dimethyl-carbamates.

*Example IX*

Ten parts of methyl N,N-dimethyl-carbamate and 90 parts of polyacrylonitrile are ball milled for sufficient time to produce a homogeneous mixture.

(a) This composition is moldable per se to produce uniform dense articles by standard molding processes using heat and pressure.

(b) Solutions of acrylonitrile polymers and copolymers are more readily prepared by dispersing such a pre-milled mixture of the polymer in additional methyl N,N-dimethyl-carbamate than with similar polymers not so treated. The use of pre-tested polymers permits the ready dispersion of the polymers in the solvent and shortens the time required for its solution.

The composition described in paragraph (a) of Example X, or similar compositions made using the other carbamates described herein, may be molded into cohesible structures, that is, it may be made cohesive under heat, pressure, or heat and pressure.

Methyl N,N-dimethyl-carbamate is preferred for a number of reasons, including economy, ease of preparation, and efficiency, for the practice of this invention. Although the ethyl and substituted-ethyl N,N-dimethyl-carbamates listed above are satisfactory for the practice of this invention, the substituted methyl N,N-dimethyl-carbamates appear to be more efficient as solvents than the corresponding ethyl derivatives, usually in the following order of decreasing activity, nitromethyl N,N-dimethyl-carbamate, cyanomethyl N,N-dimethyl-carbamate, and thiocyanomethyl N,N-dimethyl-carbamate.

The alkyl and substituted-alkyl N,N-dimethyl-carbamates can be prepared from N,N-dimethyl-carbamyl chloride by reaction, in the presence of an hydrogen halide acceptor such as pyridine or other bases, especially tertiary bases, with the alcohol or substituted alcohol corresponding to the desired carbamate. For example, with N,N-dimethyl-carbamyl chloride, methanol will give methyl N,N-dimethyl-carbamate; nitromethanol will give nitromethyl N,N-dimethyl-carbamate; cyanomethanol will give cyanomethyl N,N-dimethyl-carbamate, etc. N,N-dimethyl-carbamyl chloride is commercially available and can also be prepared by the reaction of phosgene with dimethyl amine.

Methyl N,N-dimethyl-carbamate has a boiling point of 175° C. The fact that this boiling point is higher than those of N,N-dimethyl formamide and N,N-dimethyl acetamide, 153° and 165° C. respectively, permits higher spinning temperatures and lower recovery losses. This higher boiling point also permits higher temperatures in hastening the dissolving process without the necessity of superatmospheric pressures.

The N,N-dimethyl-carbamates described herein have also been found to be good solvents and absorbents for gaseous acidic anhydrides such as sulfur dioxide, carbonic acid anhydride, etc. Apparently the high secondary-valence bonding forces which are believed to make these compounds such good solvents for acrylonitrile polymers also make them effective for retaining the gaseous anhydrides in solution. Moreover, when these solvents have sulfur dioxide, carbon dioxide, etc., dissolved therein the solvent power toward the acrylonitrile polymers is reduced. This fact may be used to advantage in certain instances to reduce the swelling and lumping effects of the solvents on acrylonitrile polymer particles. Usually when the acrylonitrile polymers are added to these solvents, the solvents swell and soften the polymer particles and promote a tendency for the particles to agglomerate and lump. This lumping makes stirring difficult and delays solution. However, the practice of decreasing the solvent power of the solvents of this invention by the use of gaseous acidic anhydrides, preferably those inert to the components and conditions of the solution, such as sulfur dioxide and carbon dioxide, has been found to facilitate mixing and stirring since the lumping tendency of the polymer particles is thereby reduced. Then, as the temperature of the solvent is raised, the gaseous anhydride is gradually driven off thereby restoring the solvent power and permitting the solvent to dissolve the polymer.

Fibers having especially advantageous properties, such as high orientation, high tenacity, high elastic recovery and low shrinkage, can be prepared from compositions of this invention by using acrylonitrile copolymers of vinyl and vinylidene chloride. These copolymers can be described as copolymers of acrylonitrile and at least one other compound having the formula

wherein X is hydrogen or chlorine. In these copolymers, as well as in the other acrylonitrile copolymers, the acrylonitrile content in the polymer molecule is preferably at least 50 percent, although in some cases copolymers having not less than 80 percent acrylonitrile are particularly advantageous.

For various purposes it may be desirable to chemically and physically modify the polymeric compositions of this invention by the presence of other materials. The N,N-dimethyl-carbamates used in this invention are also useful in the preparation of mixtures of arcylonitrile polymers with various modifying agents such as other polymers, for example, polyvinyl chloride and polyvinylidene chloride, partial solvents of nonsolvents, or mixtures of these, pigments, dyes, plasticizers, stabilizers, spinning agents, incrustation inhibitors, etc.

Typical of copolymerizing monomers which may be used with acrylonitrile in addition to or in substitution for those already mentioned are: acrylic acids, esters and amides, including their alpha-methyl and alpha-chloro derivatives; maleic and fumaric acids, esters and amides; itaconic acid and esters; vinyl aryls, such as styrene, vinyl naphthalene, vinyl diphenyl, vinyl fluorene, etc. and their alkyl, halogen, cyano and alkoxy substitution products, for example, ortho-, meta- and para-methyl-styrenes, dimethyl-styrenes, ortho-, meta- and para-chloro-styrenes, dichloro-styrenes, ortho-, meta- and para-cyano-styrenes, dicyano-styrenes, ortho-, meta- and para-methoxy-styrenes, mono- and diethyl-styrenes, vinyl methyl-naphthalenes, vinyl chloro-naphthalenes, vinyl cyano-naphthalenes, etc.; alpha-methyl-styrene, alpha,para-dimethyl-styrene, isopropenyl-naphthalenes, etc.; vinyl fluoride, tetrafluoroethylene; trifluorochloroethylene; isobutylene; ethylene; vinyl pyridines; vinyl esters; vinyl ethers; vinyl carbazole; N-vinyl imides; etc.

The acrylonitrile polymers and copolymers may be prepared by any suitable polymerization method, such as the ammonium persulfate-catalyzed polymerization of monomer or monomers dissolved or emulsified in water, or by a suspension process using organic peroxide catalysts, etc. The molecular weights of these polymers and copolymers are preferably within the range of 10,000 to 250,000, or even higher, although polymers having molecular weights between 40,000 and 150,000 may be used with particular advantage. However, polymers of molecular weights less than 10,000 may be used for other purposes, such as impregnants, solvent-resistant coatings, etc. The Staudinger equation permits evaluation of molecular weights by viscosity measurements:

$$\text{Molecular weight} = \frac{N_{sp}}{K_m C}$$

wherein $K = 1.5 \times 10^{-4}$, for many acrylonitrile polymers;

$N_{sp} = \dfrac{\text{viscosity of solution}}{\text{viscosity of solvent}} - 1$; and $C$ = the concentration of the polymer in the solvent expressed in molarity per 1000 ml of solvent at 20° C.

The molecular weight of the polymer or copolymer is dependent on the concentration of monomer or monomers, the amount and type of catalyst, temperature of reaction, etc.

As mentioned above, the compositions of this invention are especially useful in the preparation of fibers, filaments, films, etc., either by dry spinning or by wet spinning into coagulating baths of water, glycerine, acetic acid, aqueous salt solutions or other suitable liquids or mixtures of liquids which are miscible with the N,N-dimethyl-carbamates but are non-solvents or precipitants for the dissolved polymers.

In many cases, the formed article may be cold-drawn when it is substantially free from the N,N-dimethyl-carbamate. In other cases, a plasticizing effect may be obtained when the polymer contains small quantities, that is, 1–10 percent of the N,N-dimethyl-carbamate. In such latter cases, the N,N-dimethyl-carbamate acts as a plasticizer and the formed polymer may be cold-drawn at a lower temperature than the corresponding acrylonitrile polymer free of plasticizer. Acrylonitrile polymers plasticized with an N,N-dimethyl-carbamate in accordance with the practice of this invention are particularly adapted to the preparation of molded articles or extruded forms such as rods, tubing, etc. Many of the formed articles of this invention can be cold-drawn up to 600–800 percent or more and thereafter heat-treated in the stretched form at temperatures of 125–185° C. but preferably at temperatures of 145–155° C.

Fibers obtained in accordance with the invention can be stretched to oriented structures of high tenacity and high elastic recovery. These stretched fibers exhibit characteristic X-ray patterns showing orientation along the fiber axis. Yarns made from these fibers can be used in making stockings and, because of their heat-resistance, can also be fashioned into more general, all-purpose fabrics such as for blouses, suits, skirts, awnings, or for tow-ropes resistant to sea-water, etc. The compositions of this invention are also suitable for use in the preparation of various other shaped articles and also for use as lacquers or coating compositions. Moreover, products obtained from these compositions are practically free of undesirable salts and especially impervious to moisture and solvents.

The subject matter of this application was disclosed in application Serial No. 69,624 filed January 6, 1949 and abandoned prior to the filing date of the present application.

What is claimed is:

1. A composition of matter comprising polymeric acrylonitrile and an N,N-dimethyl-carbamate of the formula (CH₃)₂NCOOCH₂R wherein R is a member of the class consisting of hydrogen, methyl, nitro, cyano, thiocyano, nitromethyl, cyanomethyl and thiocyanomethyl radicals said polymeric acrylonitrile containing in the polymer molecule essentially only mono-ethylenically unsaturated units at least 80% by weight of which are acrylonitrile units.

2. A composition of matter comprising nitroethyl N,N-dimethyl-carbamate and polymeric acrylonitrile said polymeric acrylonitrile containing in the polymer molecule essentially only mono-ethylenically unsaturated units at least 80% by weight of which are acrylonitrile units.

3. A composition of matter comprising cyanomethyl N,N-dimethyl-carbamate and polymeric acrylonitrile said polymeric acrylonitrile containing in the polymer molecule essentially only mono-ethylenically unsaturated units at least 80% by weight of which are acrylonitrile units.

4. A composition of matter comprising a polymer of acrylonitrile dissolved in methyl N,N-dimethyl-carbamate, said polymer containing in the polymer molecule essentially only mono-ethylenically unsaturated units at least 80% by weight of which are acrylonitrile units.

5. A composition of matter comprising an N,N-dimethyl-carbamate of the formula (CH₃)₂NCOOCH₂R wherein R is a member of the class consisting of hydrogen, methyl, nitro, cyano, thiocyano, nitromethyl, cyanomethyl and thiocyanomethyl radicals, and a copolymer of acrylonitrile and at least one compound having the formula $$\begin{array}{c} CH_2=C-Cl \\ | \\ X \end{array}$$

wherein X is a member of the class consisting of hydrogen and chlorine, said copolymer containing in the polymer molecule essentially only mono-ethylenically unsaturated units at least 80% by weight of which are acrylonitrile units.

6. A composition of matter comprising methyl, N,N-dimethyl-carbamate and a copolymer of acrylonitrile and vinylidene chloride, said copolymer containing in the copolymer molecule essentially only mono-ethylenically unsaturated units at least 80% by weight of which are acrylonitrile units.

7. A composition of matter of claim 2, in which the polymer has a molecular weight between 10,000 and 250,000.

8. A fiber comprising polymeric acrylonitrile and an N,N-dimethyl-carbamate of the formula (CH$_3$)$_2$NCOOCH$_2$R, wherein R is a member of the class consisting of hydrogen, methyl, nitro, cyano, thiocyano, nitromethyl, cyanomethyl and thiocyanomethyl radicals said polymeric acrylonitrile containing in the polymer molecule essentially only mono-ethylenically unsaturated units at least 80% by weight of which are acrylonitrile units.

9. A fiber comprising an N,N-dimethyl-carbamate of the formula (CH$_3$)$_2$NCOOCH$_2$R, wherein R is a member of the class consisting of hydrogen, methyl, nitro, cyano, thiocyano, nitromethyl, cyanomethyl and thiocyanomethyl radicals, and a copolymer of acrylonitrile and at least one compound of the formula $$CH_2=C-Cl$$
$$\quad\ \ |$$
$$\quad\ \ X$$

wherein X is a member of the class consisting of hydrogen and chlorine, said copolymer containing in the polymer molecule essentially only mono-ethylenically unsaturated units at least 80% by weight of which are acrylonitrile units.

10. A cold-drawn, heat-treated fiber comprising an acrylonitrile polymer and an N,N-dimethyl-carbamate of the formula (CH$_3$)$_2$NCOOCH$_2$R wherein R is a member of the class consisting of hydrogen, methyl, nitro, cyano, thiocyano, nitromethyl, cyanomethyl and thiocyanomethyl radicals, said polymer containing in the polymer molecule essentially only mono-ethylenically unsaturated units at least 80% by weight of which are acrylonitrile units.

11. A composition of matter comprising polyacrylonitrile and an N,N-dimethyl carbamate of the formula (CH$_3$)$_2$NCOOCH$_2$R wherein R is a member of the class consisting of hydrogen, methyl, nitro, cyano, thiocyano, nitromethyl, cyanomethyl and thiocyanomethyl radicals.

12. A composition of matter comprising polyacrylonitrile and methyl N,N-dimethyl carbamate.

13. A composition of matter comprising polyacrylonitrile and beta-nitroethyl N,N-dimethyl carbamate.

14. A composition of matter comprising polyacrylonitrile and cyano-methyl N,N-dimethyl carbamate.

15. A fiber comprising polyacrylonitrile and an N,N-dimethyl carbamate of the formula (CH$_3$)$_2$NCOOCH$_2$R wherein R is a member of the class consisting of hydrogen, methyl, nitro, cyano, thiocyano, nitromethyl, cyanomethyl and thiocyanomethyl radicals.

16. A cold-drawn, heat-treated fiber comprising polyacrylonitrile and methyl N,N-dimethyl carbamate.

GAETANO F. D'ALELIO.

References Cited in the file of this patent

UNITED STATES PATENTS

| Number | Name | Date |
|---|---|---|
| 2,404,716 | Hansley | July 23, 1946 |
| 2,433,595 | Campbell | Dec. 30, 1947 |
| 2,460,578 | Houtz | Feb. 1, 1949 |
| 2,461,358 | Vanderbilt | Feb. 8, 1949 |